United States Patent
Fernandez-Ramos

(10) Patent No.: US 8,396,612 B2
(45) Date of Patent: Mar. 12, 2013

(54) AVIONIC SYSTEM AND ARCHITECTURE WITH INTEGRATED POWER MANAGEMENT

(75) Inventor: Yvan Fernandez-Ramos, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 969 days.

(21) Appl. No.: 11/774,186

(22) Filed: Jul. 6, 2007

(65) Prior Publication Data

US 2008/0027592 A1 Jan. 31, 2008

(30) Foreign Application Priority Data

Jul. 7, 2006 (FR) ...................................... 06 52869

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |

(52) U.S. Cl. ......................................................... 701/3
(58) Field of Classification Search ................ 701/3, 36, 701/99; 713/300, 310, 340
See application file for complete search history.

(56) References Cited

U.S. PATENT DOCUMENTS

| | | | | |
|---|---|---|---|---|
| 5,752,047 A | * | 5/1998 | Darty et al. | 713/300 |
| 6,175,783 B1 | * | 1/2001 | Strength et al. | 701/13 |
| 6,283,416 B1 | * | 9/2001 | Fleeter et al. | 244/158.1 |
| 7,007,179 B2 | * | 2/2006 | Mares et al. | 713/310 |
| 7,162,653 B2 | * | 1/2007 | Mares et al. | 713/310 |
| 7,549,069 B2 | * | 6/2009 | Ishihara et al. | 713/320 |
| 2003/0095367 A1 | * | 5/2003 | Mares et al. | 361/93.7 |
| 2005/0121978 A1 | * | 6/2005 | McAvoy | 307/43 |

FOREIGN PATENT DOCUMENTS

EP 1143593 B1 4/2005

* cited by examiner

*Primary Examiner* — Thomas Tarcza
*Assistant Examiner* — Rami Khatib
(74) *Attorney, Agent, or Firm* — Perman & Green, LLP

(57) ABSTRACT

An avionic system includes computers (11a, . . . , 1n, 12a, . . . 12n, 13a . . . 13n) of the generic computer type that can be adapted by software programming to avionic functions for which at least some of these computers have means that combine electronic resources for data processing, computation and communication by analog or digital bus with electric power management resources so as to create modular avionics with integrated power.

11 Claims, 5 Drawing Sheets

110 Airplane information networks
109 Signal input
105 Signal output
110 Airplane information networks
108 Airplane electric system
107 Power inputs
112 Electronic supply
111. Power output
106 System loads Top left: Airplane information networks
109 Signal input
105 Signal output
Top right: Airplane information networks
Bottom left: Airplane electric system
107 Power inputs
112 Electronic supply
111 Power output
106 System loads 104 Airplane information networks
109 Signal input
105 Signal output
Top right: Airplane information networks
Bottom left: Airplane electric system
108 Power inputs
112 Electronic supply
111 Power output
106 System loads

AVIONIC SYSTEM AND ARCHITECTURE WITH INTEGRATED POWER MANAGEMENT

BACKGROUND OF THE INVENTION

The disclosed embodiments concern an avionic system and architecture with integrated power management and particularly relates to a multisystem avionic architecture concept and system based on onboard computers with management of electric power integrated in the computers as well as an aircraft equipped with such a system.

The use of semiconductor power controller systems (called "Solid State Power Controller" or "SSPC" according to the English terminology) for the management of electric power in aircraft is known.

These electronic power systems combine a programmable control logic with electric power switching components based on semiconductors.

The power switching components based on semiconductors eliminate moving parts, as opposed to electromechanical components (relays, circuit-breakers) traditionally used in the industry.

An SSPC channel is used to monitor an electric line supplying a system or a load and can be dedicated to alternating or direct current.

Several SSPC channels can be grouped in an electronic board. This board has a microprocessor and a program that can be easily reconfigured by downloadable modifications.

The functions provided by these switching components are protection against wiring short-circuits or electric loads, power switching by the receiving and processing of external commands of the discrete signal type or commands carried by digital buses, surveillance and report of the state of the channel or channels, still by discrete signals or by messages sent on digital buses.

This technology, for example, is used in the airplane electric distribution system of the Airbus A380 airplane to supply and switch electric loads that are shared among airplane onboard systems.

In other previous airplanes, the functions provided by the SSPCs were effected by electromechanical circuit-breakers and relay-based hardwired logic units, and the advantage of SSPCs resides in their flexibility, due to the fact that they are based on a programmable logic, their robustness relative to vibrations and the reliability of semiconductor switching components that they use.

Semiconductor power controller systems (SSPCs) with secondary electric distribution are arranged in specific cabinets.

These cabinets and the SSPCs are defined and developed by teams of electric system engineers who are also responsible for the integration of these systems with the rest of the electric system, even though the switching logic units as well as the configuration of electric protections are defined by the designers of the onboard systems supplied by the SSPCs.

It is also known to equip aircraft with onboard integrated modular avionics (in English "Integrated Modular Avionics", "IMA").

Integrated modular avionics is a general term that describes a network of onboard computers of the generic computer type, containing computation and communication resources that are available to the airplane systems, contrary to traditional avionics based on specialized computers specifically designed for given functions.

Distributed software applications are installed on these computers to fulfill the different functions of different systems so that a single IMA computer can offer its resources to several systems.

In an IMA avionic system, instead of having different computers for different systems, as in traditional avionics, one has generic computers that can be adapted by software programming that optimizes and simplifies the implementation of systems.

However, at this time, there are no configurations integrating semiconductor power systems into modular avionics and, while onboard modular avionics IMA use onboard systems for communication and computation resources, they do not integrate functions linked to the management of electric power.

In the current tendency towards all-electric airplanes, the need to control electric loads of the system (electric pumps, actuators, lighting, etc.) and to protect the associated wiring is common to almost all onboard systems.

This tendency and the absence of integration of power management in onboard modular avionics leads to concentrating the modules and the avionic computers in avionic cabinets, while electric functions are concentrated in electric cabinets and relay boxes, or cabinets comprising semiconductor power controller systems, such as in the A380 electric distribution.

This architecture poses the problem that the electric definition of onboard systems is divided.

In fact, the electric definition of each onboard system is the responsibility of a team specialized in the field of this system.

With SSPC technology, the definition of SSPC cabinets has become the responsibility of a particular electric team.

The definition of the system is therefore shared with the electric team responsible for the SSPC cabinets since the data that are used to design the configuration of the cabinet are defined by the electric system team according to the needs of the system teams.

Any electric modification of a system becomes also a modification of the SSPC cabinet.

Consequently, the definition of the system is no longer complete without the electric team's definition of the SSPC cabinet.

Splitting the definition of the electric power part can lead to problems of management of configuration and of industrial application of modifications.

A second disadvantage is the length of the wiring between the systems and the SSPCs.

The functions of onboard systems are implemented on onboard computers. These computers are all installed in avionic cabinets. In contrast, their power management needs are implemented either in SSPC cabinets, or in classical cabinets and relay boxes, which requires using bundles of wires between these systems.

In addition to these problems, such an architecture creates the need to define and develop two separate equipment systems in parallel: on the one hand, the IMA equipment, and on the other hand, the SSPC-based equipment or electric equipment based on electromechanical components, in order to provide functions common to the needs of the aircraft systems. It goes without saying that it is also necessary to implement specific cabinets to install this equipment on the airplane, on the one hand, avionic cabinets and, on the other hand, electric cabinets.

SUMMARY OF THE INVENTION

The disclosed embodiments propose an avionic system comprising computers of the generic computer type that can be adapted by software programming to avionic functions for which at least certain of these computers have means that combine electronic resources of data processing, computation and communication by analog or digital buses with electric power management resources so as to provide modular avionics with integrated power.

More precisely, the power management resources are semiconductor power controller systems.

Advantageously, the avionic system according to the invention has a computer network equipped to optimize the definition, implementation and exploitation on the aircraft of functional needs of onboard systems, as well as future modifications.

Data processing and computation resources are, in particular, architectures comprising microcontrollers and/or microprocessors, which are assisted by memory and interface registers.

Communication resources are, in particular, input/output modules permitting sending and acquiring data by analog or digital bus or by communication network (Ethernet, PCI, ARINC 429, etc.).

Advantageously, these modules are designed, in particular, to process information such as the data necessary for the functioning of onboard systems, such as measurement parameters coming from sensors, or discrete signals or hardwired analog signals, messages, commands, etc.

The electric power management resources of the semiconductor power controller systems type, in particular, process alternating current or direct current power, or both.

These semiconductor power controller systems resources advantageously provide functions of switching electric loads and protecting wiring.

Modular avionics with integrated power according to the disclosed embodiments have the advantage that they permit fulfilling a large part of the needs of onboard systems in terms of data processing, computation, communication, load switching, electric protection, and they perform all of this with a single type of computer common to all systems.

Moreover, this system architecture permits combining both the functional and electric components of an onboard system under the responsibility of a single team of system designers. It permits reducing the length of electric wiring between the computers of onboard systems and their electric components due to the fact that power management is integrated in the system computers.

It eliminates the need to define and develop in parallel two separate systems of equipment and to implement a specific cabinet dedicated to low power electric distribution containing SSPCs or electromechanical elements.

According to one advantageous embodiment, the avionic system comprises computers having data processing resources and computation resources in addition to communication resources and electronic power management resources.

According to a complementary and/or alternative embodiment, the avionic system comprises computers containing means designed to receive commands by digital bus or by discrete signal and/or to send back information concerning the good functioning and the state of the switching elements.

DESCRIPTION OF THE DRAWING

Other characteristics and advantages of the disclosed embodiments will appear upon reading the description that follows of one non-limiting example of embodiment of the invention in reference to the drawings, which show.

DETAILED DESCRIPTION OF THE INVENTION

Figure 1:
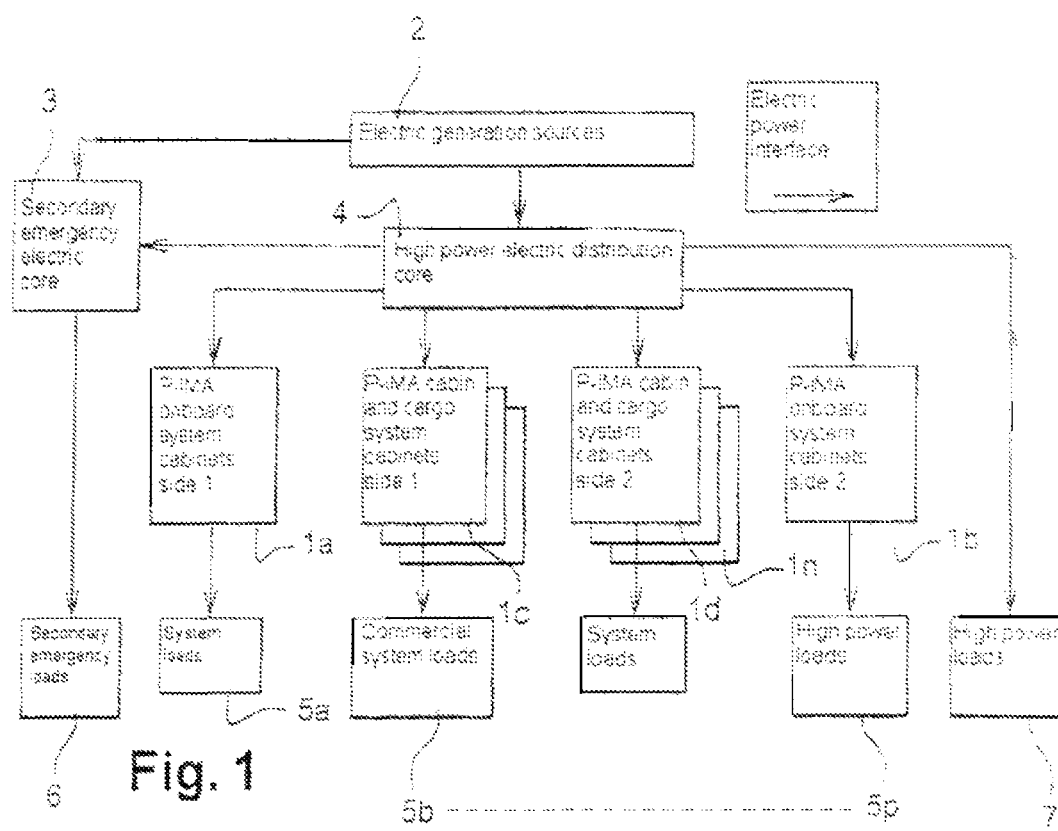
FIG. 1: a first example of the electric architecture of an aircraft according to one embodiment.

The example of FIG. 1 describes a definition of electric architecture of an aircraft comprising computer cabinets 1a, 1b, 1c . . . 1n, of the generic computer type that can be adapted to avionic functions by software programming and provided with electric power management resources.

According to this example, the electric architecture of the aircraft comprises electric generation sources 2 connected to a primary electric distribution system 4, the high power electric distribution core, and to an emergency electric distribution system 3, a secondary emergency electric core.

Secondary emergency electric core 3 is dedicated to supplying the necessary loads for flight safety under degraded conditions following critical breakdowns, or in the case where total power might be limited.

From primary distribution system 4, power supplies are distributed by primary lines towards distribution nodes comprising cabinets 1a, 1b, 1c, . . . , 1n which in turn distribute power to systems 5a, 5b, . . . 5p.

Primary electric distribution system 4 made up of the high power electric distribution core will tap power from sources to P-IMA avionics cabinets. Power is transmitted to the cabinets through wires that are protected in the high power core, these wires being more numerous and of smaller section than the wires between the sources and the high power core.

According to the disclosed embodiments, this example thus comprises an assembly of modular avionics cabinets with integrated power (P-IMA), which contain P-IMA computers.

The cores and the cabinets will supply all the electric loads of the aircraft.

According to this plan, equipment requiring high power 7 remains directly supplied by primary electric distribution system 4 and secondary emergency equipment 6 remains directly supplied by emergency electric distribution system 3.

In the electric distribution of an aircraft shown in FIG. 1, the system of generation sources supplies the network of electric distribution cabinets, for example, with direct current 28 V DC or alternating current 115 V AC.

The cabinet computers are modular computers and comprise:

computers having means that combine electronic communication resources by analog or digital bus and computation resources with electric power management resources.

Figure 3A:
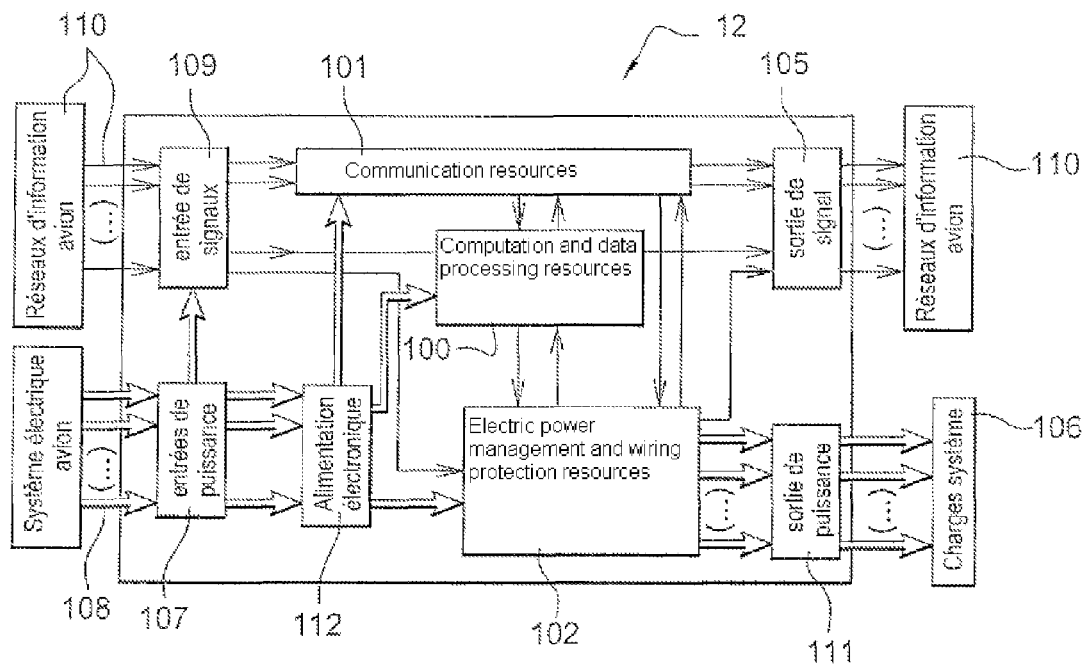
FIGS. 3A to 3C: examples of embodiments of computers for an avionic system according to one embodiment.

These computers are then power, computation and input/output modules (English acronym P-CPIOM for Power-Core Processing Input Output Module) 12, an example of which is shown in FIG. 3A, computers containing the following resources: data processing and computation resources 100 (CPU for Central Processing Unit), communication resources 101 (IOM, Input/Output Module) and electronic power management resources 102;

computers comprising means that combine electronic communication by analog or digital bus resources with electric power management resources without computation resources for the systems.

Figure 3B:
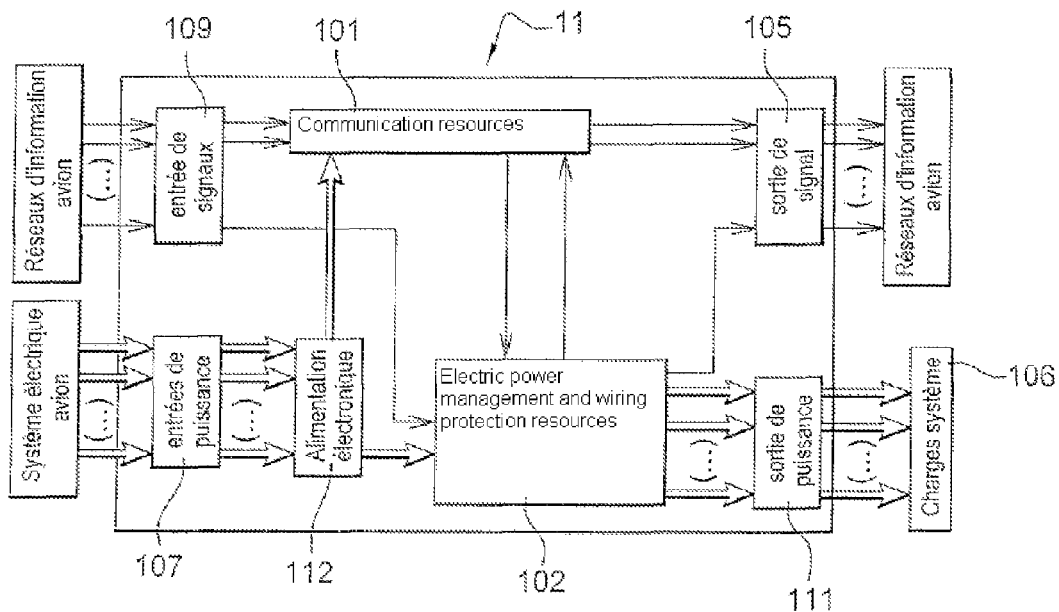

These computers are then power and input/output modules (English acronym P-IOM for Power—Input Output Module) 11, an example of which is shown in FIG. 3B, computers containing the following resources: communication resources 101 and electric power management resources 102;

computers comprising means that combine electronic resources that permit receiving commands and sending and acquiring information by analog or digital bus or by communication network for which the input/output modules are designed to process information, in particular, such as the data necessary for the functioning of onboard systems such as parameters for measurements coming from sensors, or discrete or hardwired analog signals, messages, commands, etc.

Figure 3C:
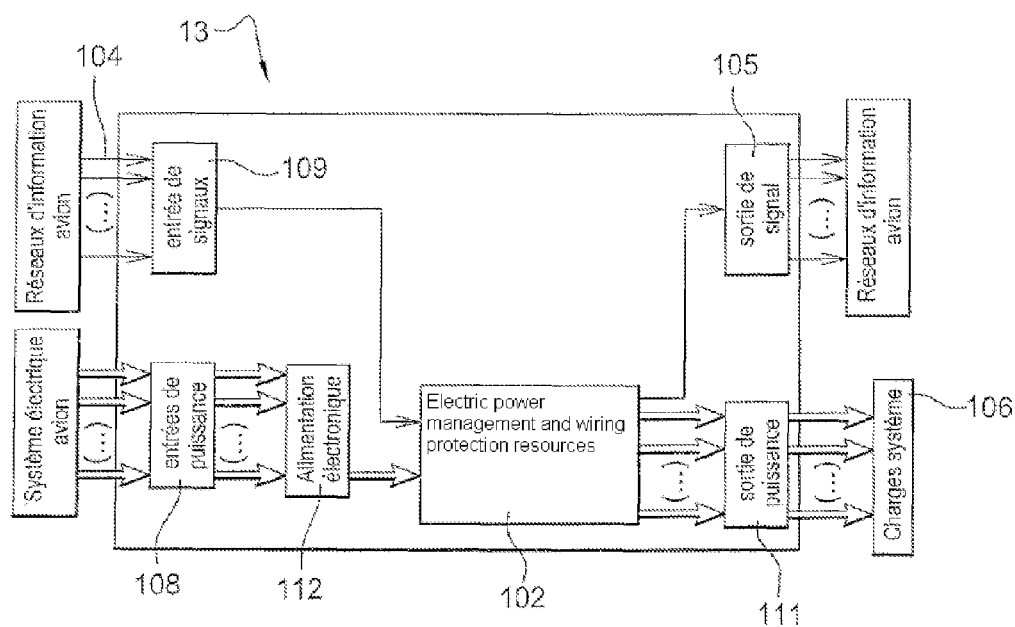

These computers are then power switching computers (English acronym P-MM: Power Management Module) 13, an example of which is shown in FIG. 3C, a computer containing the following resources: electronic power management resources 102 with a minimum of communication functions, which permits receiving commands by a digital bus 104 or by discrete signal and, if necessary, sending back data 105 concerning the good functioning and the state of each switching element.

Computers P-IOM 11, P-CPIOM 12 and P-MM 13, in common, have a power input module 107 connected to one or more power buses 108 of the airplane electric systems, a digital and/or analog signal input module 109 connected to airplane information networks 110, the signal output module 105 providing data processed by these computers to the airplane information networks, a power output module 111 to supply electrical system loads 106 of the airplane and an internal electronic supply module 112.

The network of avionics cabinets according to the invention is formed by an assembly of these computers, some of which can also have distributed software functions for the systems.

Within the scope of the disclosed embodiments, it is of course possible to combine avionics and traditional electric cabinets with modular avionics cabinets with P-IMA integrated power. One example notably consists of the secondary emergency electric core.

The invention applies, for example, to a complex onboard system such as the fuel management system, which will be used as an illustration hereinafter, but can be generalized to any onboard system.

The fuel management system is made up of:

a structural part bearing divided tanks in the wing and horizontal tail unit of the airplane, which permit storing the fuel, pipelines and levels for communication between tanks, which permit transferring the fuel from one compartment to another or between different tanks, electrical loads 106 such as engine feed pumps, pumps for transferring fuel between tanks, valves for communication between tanks, an assembly of sensors that permit measuring parameters such as the temperature inside the tanks, the quantity of fuel, the output pressure of a pump, the physical position (open or closed) of a valve, etc.

Electrical loads need a supply and associated protection with electrical wiring and sensors that require being supplied and connected to computers.

Moreover, such a system requires a function and command and monitoring means for the system in its entirety. These means receive all the parameters coming from the associated sensors as well as possibly other systems of the aircraft, in addition to data and information concerning the total duration of the flight, the phase of the flight, the total onboard mass or other information. With all this information, the system command and monitoring means will command the operation of pumps and valves so as to optimize fuel consumption throughout the flight, to equilibrate the aircraft, to mitigate or counter the effects of possible breakdowns and to carry out specific commands required by the cockpit.

This system finally requires a function 105 for reporting information and communication with the cockpit and the other onboard systems and a function for detecting and signaling breakdowns.

For these functions and command and monitoring means, the modular avionic computers with integrated power according to the disclosed embodiments will permit carrying out the following functions:

command and monitoring of the system in its entirety, acquisition and processing of data coming from sensors, the cockpit and other onboard systems, information report to the cockpit and other onboard systems, detection and signaling of breakdowns, supply and command of electric loads protection of the associated wiring.

Moreover, avionic computers according to the disclosed embodiments, and in particular those endowed with computation means will be able to share their resources with applications of systems other than the fuel management system.

Figure 2:
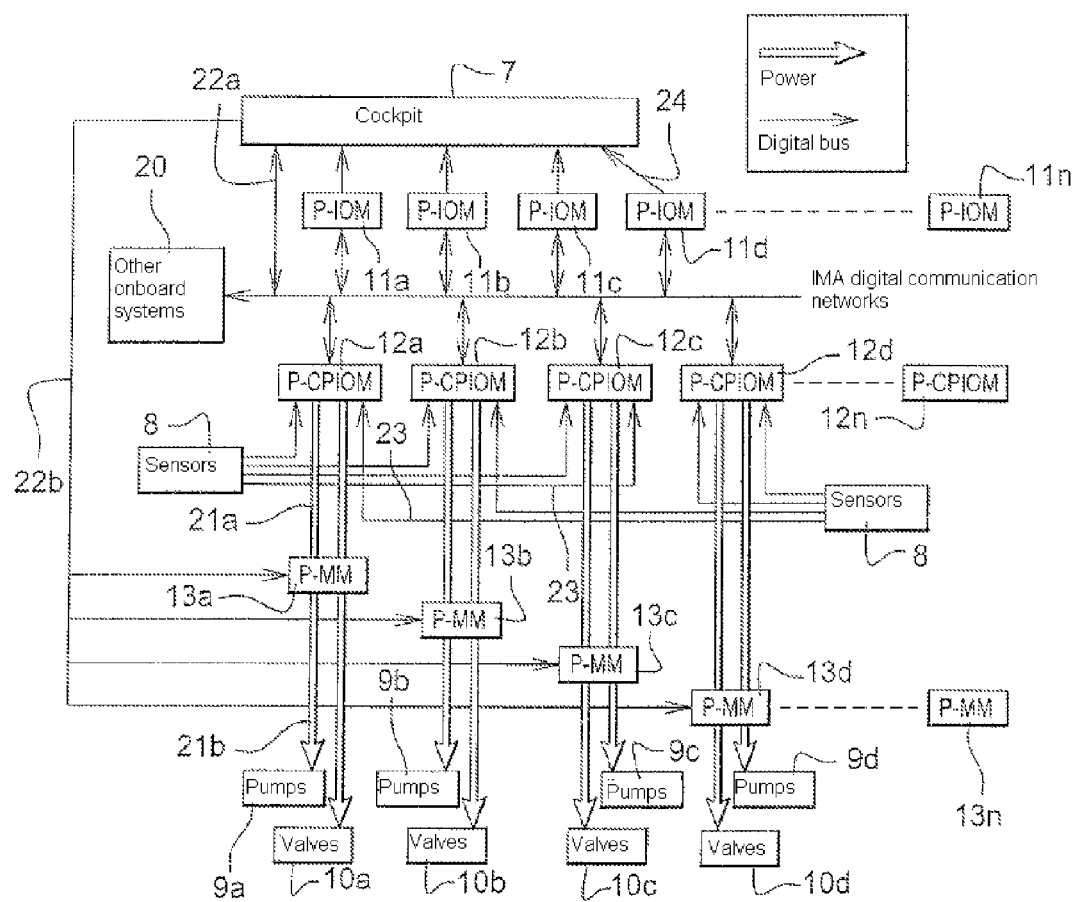
FIG. 2: a second example of the avionic architecture of an onboard system.

FIG. 2 shows an example of embodiment of such a fuel management system and its architecture with P-IMA computers of the invention.

The avionic system represented starts from cockpit 7 connected to the computers of the invention by digital buses or networks 22a, 22b (Ethernet, AFDX, CAN, Arinc 429 or other bus) in which data and commands are exchanged.

A first level of computers of the system according to the disclosed embodiments is made up of computers 11a, 11b, 11c, 11d, . . . 11n which combine electronic resources for communication by analog or digital bus and for computation with electric power management resources (computers of the P-IOM type containing communication resources (IOM, Input/Output Module and electric power management resources).

These computers comprise one or more boards dedicated to acquiring and transmitting signals and data according to numerous protocols and different physical supports: Ethernet, AFDX, CAN, Arinc 429 bus, on analog or digital or other networks 22a, one or more boards dedicated to providing electric supply to all the electronic components of the computer and one or more boards dedicated to the management of electronic power of the systems, based on SSPCs. These boards also have power converters and associated protections.

First level computers send back information on system functioning to the cockpit by connections 24.

This first level of computers communicates through network 22a with a second level of computers 12a, 12b, 12c, 12d, . . . , 12n according to the invention.

This second level is made up of computers having means that combine electronic communication by analog or digital bus resources 22a and computation resources with electric power management resources so as to create a modular avionics with integrated power as well as data processing and computation resources (P-CPIOM computers).

These computers comprise one or more boards, dedicated to processing data such as data from sensors 8 transmitted over lines 23 and command data sent by the cockpit over a network 22b and which have, among other things, components such as microcontrollers, registers and memories; they also have one or more boards dedicated to the acquisition and transmission of signals and data, communication chips according to protocol and Ethernet, AFDX, CAN, Arinc 429 or other bus supports; [and] they also have one or more boards dedicated to providing an electric supply to all the electronic components of the computer and one or more boards dedicated to the management of electronic power based on SSPCs. Like P-IOM computers, these computers have power converters and associated protections.

These boards can integrate several functions among the management functions of the fuel management system described.

P-CPIOM computers of the second level manage electric power designed to supply the computers of a third level over power lines 21a; the third level computers distribute the power to fuel management systems such as pumps 9a, . . . , 9d and valves 10a, . . . , 10d through lines 21b.

The third level of computers 13a, . . . , 13d, 13n is made up of power management computers (P-MM for Power Management Module according to the English terminology). These computers contain electric power management resources with a minimum of communication functions that permit receiving commands by digital bus or by discrete signal and sending back information concerning the good functioning and the state of each switching element.

Among the electronic boards of these computers can be presented:

One or more boards dedicated to acquiring and transmitting signals and data in a specific manner, according to protocols and supports similar to boards of computers of the first and second levels, one or more boards dedicated to providing electric supply to all the electronic components of the computer and one or more boards dedicated to electronic power management, based on SSPCs, the power being provided to actuators of the fuel management system.

Computers of this third level receive their power from second level computers by lines 21a, receive cockpit commands by network 22b and distribute electric power to actuators by lines 21b.

The computers of the invention are advantageously grouped in cabinets.

A P-IMA cabinet is, in particular, an electronic cabinet made in conformity with the Arinc 600 standard or a similar standard, which permits installation on the aircraft of P-IMA type computers.

The computers are also advantageously provided conforming to the ARINC 600 standard and have several printed electronic boards mounted on a chassis and interconnected by a motherboard. On the motherboard are arranged signal and power connectors. The electronic boards and the motherboard are mounted inside a box.

In a known manner, boxes enclosing computer boards have openings that permit blowing air through the computers. The boards are installed in a manner parallel to this air flow, which crosses the computer vertically. This principle permits optimizing the heat dissipation of the boards.

The invention based on computer networks whose material configuration is not specific for a particular function and comprising the power management means permits a great flexibility of embodiment of the systems, [and] a simplification of the electric current distribution networks that can be processed in the same manner as the data communication networks and distributed in a rational and homogeneous manner in the aircraft according to a tree structure.

The modular avionic system with integrated power according to the invention also permits simplifying the digital communication network which is associated with it, each level of computers that constitutes the system being made up of a standardized type of computer.

The invention claimed is:

1. An avionic system comprising:
    a network of general purpose computer processors interconnected to control operational functions of an aircraft, wherein one or more of said general purpose computer processors comprise:
        a first processor adapted to execute computer software modules to provide at least one of data processing, computation and communication resources for one or more onboard systems; and
        an integrated electric power management processor adapted to provide an electric power management function by receiving commands from the first processor to monitor and control electric power to electrical loads of the one or more onboard systems controlled by the first processor
        wherein the electric power management function is distributed among the general purpose computer processors of the network and integrated within several of the general purpose computer processors.

2. The avionic system according to claim 1 wherein the integrated electric power management processors comprise semiconductor power controller systems.

3. The avionic system according to claim 1, wherein the network of computers is adapted to optimize a definition, implementation and use on the aircraft of the functional needs of the one or more onboard systems, as well as future modifications, integrated with electric power management resources.

4. The avionic system according to claim 1, wherein the data processing and computation resources comprise architectures having one or more of microcontrollers and microprocessors, which are assisted by memory and interface registers.

5. The avionic system according to claim 1 wherein the communication resources comprise input/output modules permitting sending and acquiring information by analog or digital bus or by a communication network.

6. The avionic system according to claim 5 wherein the input/output modules are designed to process data necessary for the functioning of onboard systems comprising measurement parameters coming from one more of sensors, discrete signals, wired analog signals, messages, and commands transported over the interconnected network.

7. The avionic system according to claim 1 wherein the integrated electric power management processor is adapted to execute electric load switching functions and wiring protection.

8. The avionic system according to claim 1 wherein at least some of the general purpose computer processors contain means designed to perform one or more of receive commands by a digital bus or by a discrete signal and to send back information concerning the good functioning and the state of the switching elements.

9. The avionic system according to claim 1, wherein the network is arranged as a tree structure of computer levels not specific for a particular function and comprising power management means and electric current distribution networks distributed according to the tree structure.

10. An aircraft, equipped with an avionic system according to claim 1.

11. The avionics system according to claim 1 wherein the electric power management function is distributed among the general purpose computer processors of the network and integrated within each of the general purpose computer processors.

* * * * *